Nov. 26, 1968 A. S. VOLPIN 3,412,748
AUTOMATIC SEALANT SEALED VALVE WITH SEALING GROOVE PURGING MEANS
Filed April 11, 1966 3 Sheets-Sheet 1
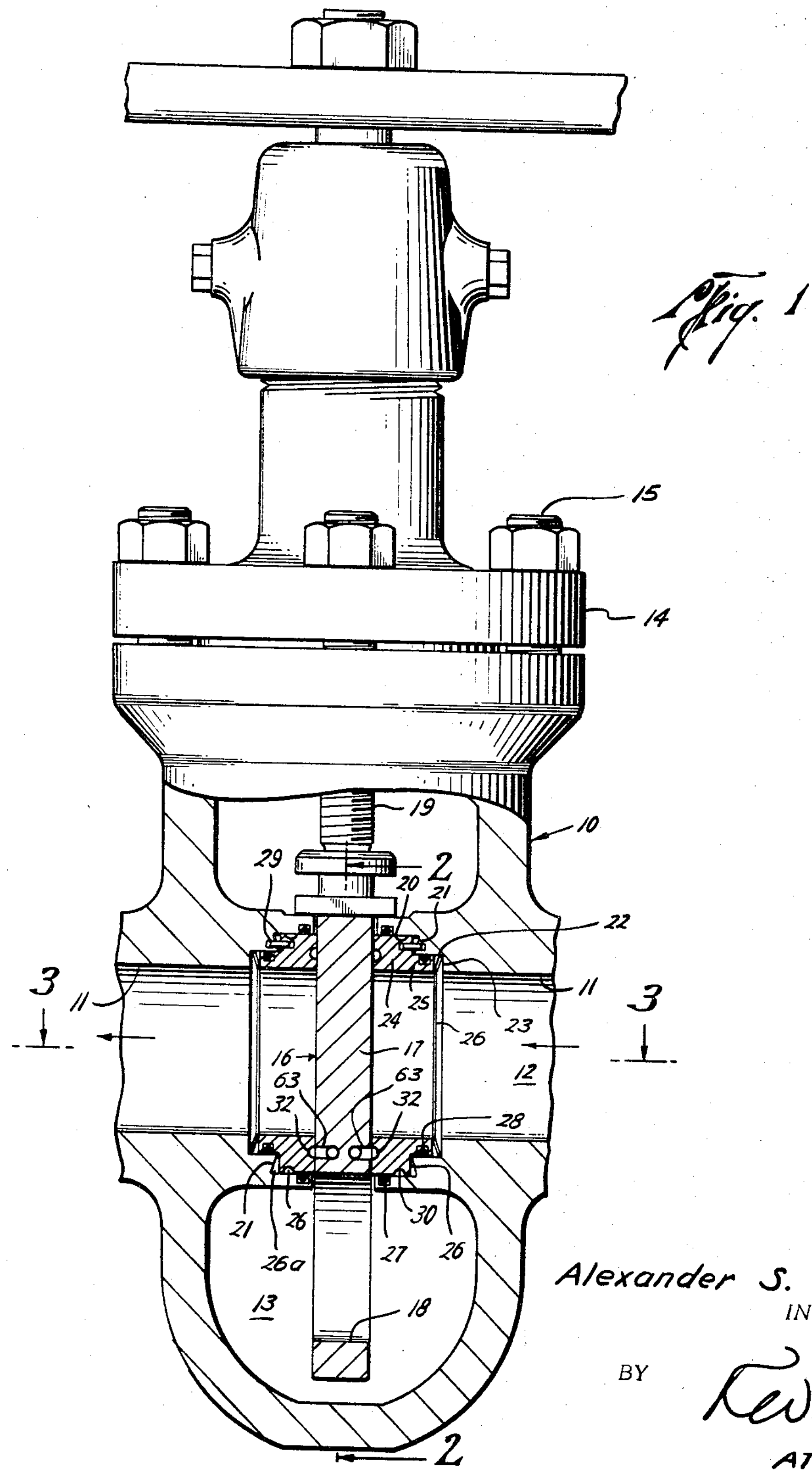
Alexander S. Volpin
INVENTOR.
BY
ATTORNEY Nov. 26, 1968 A. S. VOLPIN 3,412,748
AUTOMATIC SEALANT SEALED VALVE WITH SEALING GROOVE PURGING MEANS
Filed April 11, 1966 3 Sheets-Sheet 2
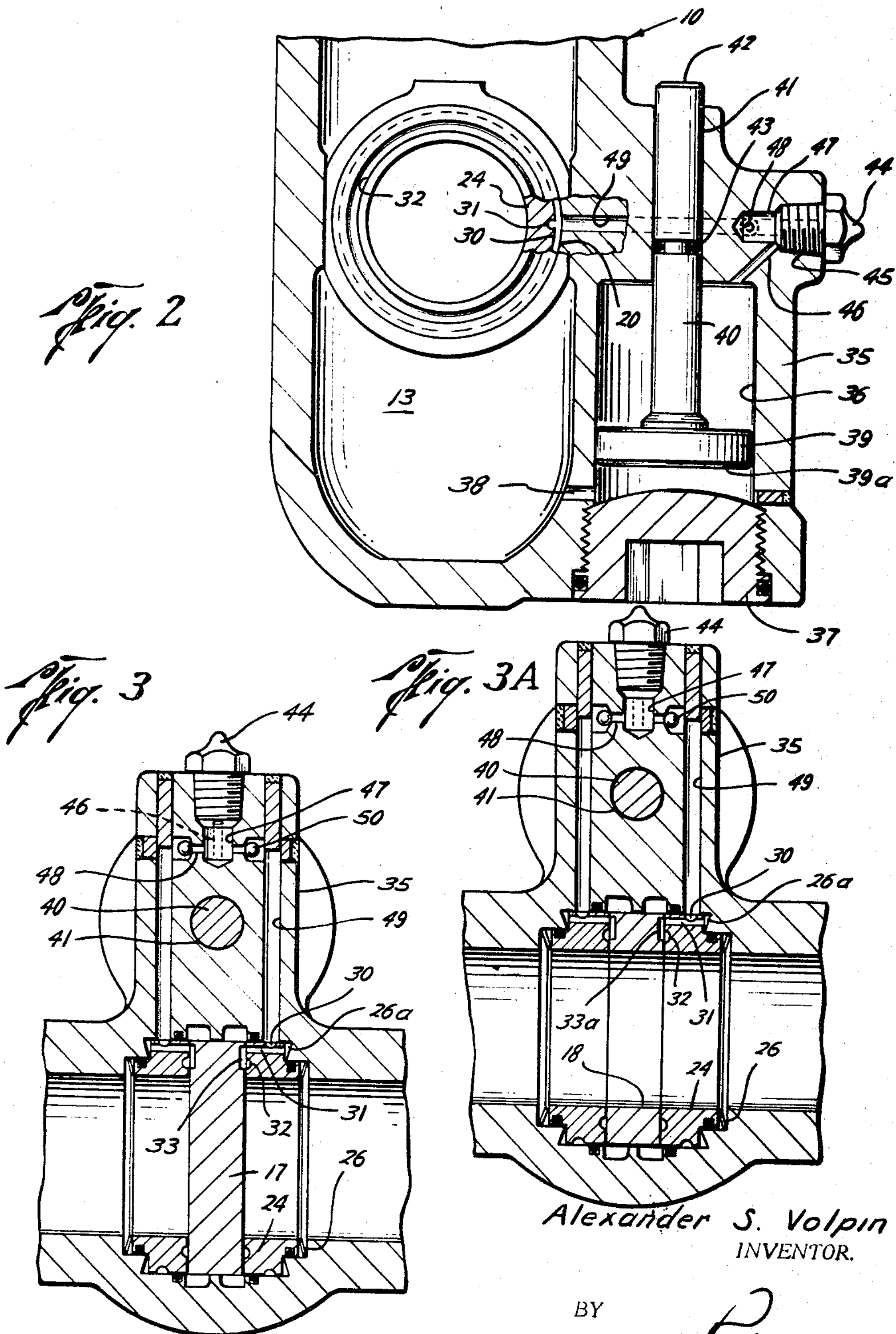
Alexander S. Volpin
INVENTOR.
BY
ATTORNEY

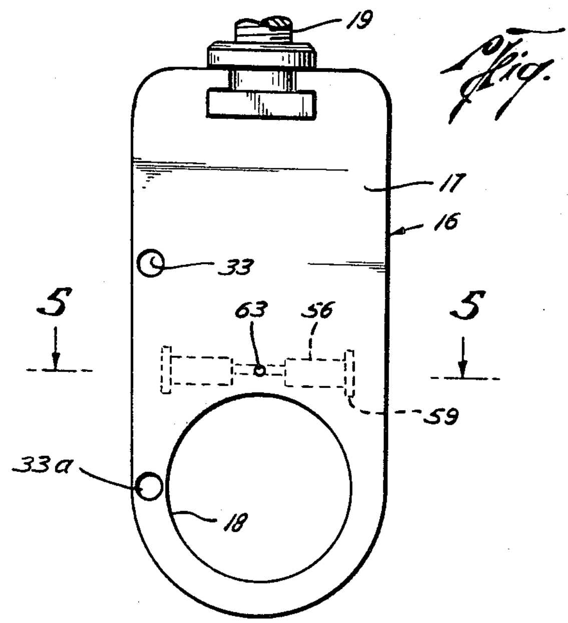
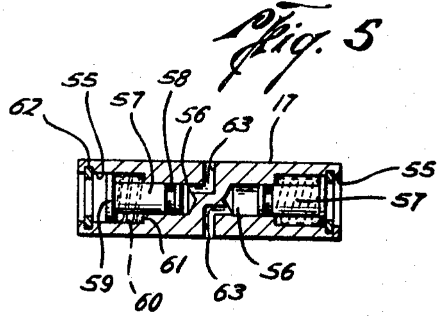
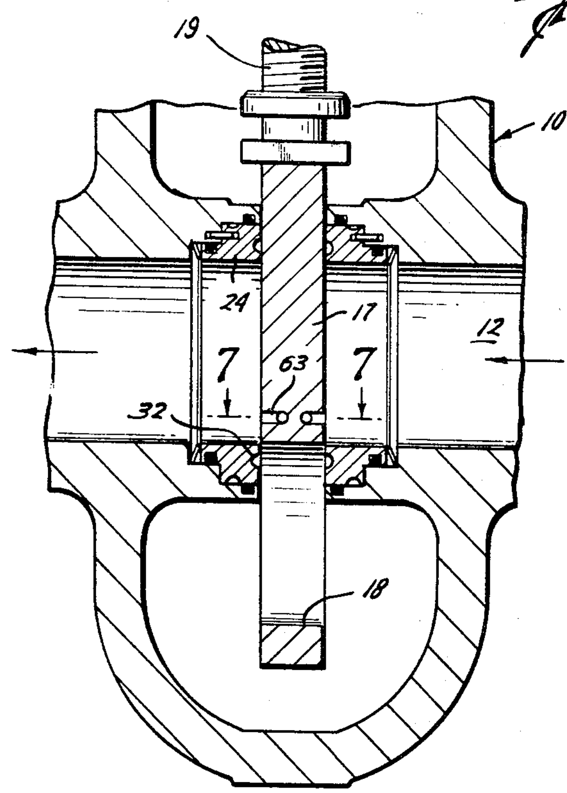
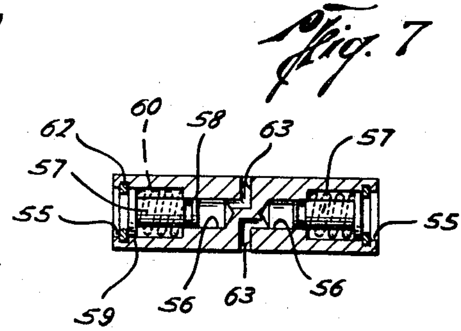
Alexander S. Volpin
INVENTOR.
BY
ATTORNEY 3,412,748
Patented Nov. 26, 1968

3,412,748 AUTOMATIC SEALANT SEALED VALVE WITH SEALING GROOVE PURGING MEANS

Alexander S. Volpin, 10200 W. Broadview Drive, Miami Beach, Fla. 33154

Filed Apr. 11, 1966, Ser. No. 541,655
11 Claims. (Cl. 137—239)

This invention relates to automatic sealed valves employing a lubricant or other plastic sealant for sealing between the closure and seat elements of the valve, and more particularly to automatic sealed gate valves.

Automatic sealed valves of the general class mentioned usually employ a pair of reservoirs, sealant being supplied from a downstream reservoir by the action of a piston member responsive to the differential pressure between the upstream side and the downstream sealant groove of a leaking valve, the reservoirs being in communication with sealing grooves disposed about the valve flow ports between the abutting faces of the closure member and the seat elements when the closure member is in the closed position.

Because of the necessary communication between a single reservoir and the sealing grooves on the upstream and downstream sides of the closure member when the reservoir is being filled with sealant, the latter may leak out between the upstream seat and the related closure surfaces, with attendant losses of substantial amounts of sealant in such cases.

Accordingly, it is a primary object of the present invention to provide an improved valve construction which will effectively obviate problems of the kind noted.

The improved structure in accordance with this invention contemplates the combination of upstream and downstream slidable seat rings in communication with a single sealant reservoir fitted with a dual-area sealant-displacing piston so that the resultant reservoir sealant pressure will urge the seat members into sealing engagement with the valve closure under pressures substantially in excess of the differential pressures ordinarily available for effecting automatic sealing of the valve.

More specifically, the invention contemplates the employment of a single reservoir for supplying both the upstream and downstream sealing grooves and fitted with a sealant-displacing piston having two pressure-active areas so arranged that one area is acted upon by the line pressure differential between the upstream and downstream sides of the valve when the closure is in the flowway-closing position, and the other area is exposed to the differential pressure between the atmosphere and the line pressure on the upstream side of the valve whereby to increase substantially the total pressure being exerted by the piston on the sealant in moving the latter toward the sealing grooves.

The increased pressure generated by the dual area piston is made additionally effective for preventing loss of sealant into the valve flowway by providing a rearwardly facing annular area on the slidable seat ring exposed to the pressure of the sealant, which area is made greater than the annular area defined by the sealing groove on the opposite sealing face of the seat element. This greater annular area bearing greater hydraulic forces will be effective to urge and maintain the slidable upstream seat into tight sealing contact with the closure. This is of particular benefit when sealant is being introduced into the reservoir under high sealant gun pressure.

This invention also contemplates the provision of trap chambers in the closure member positioned to communicate with the sealing grooves at appropriate stages in the operation of the closure member to receive and trap non-sealant material displaced from the sealing groove by entering sealant. The trap chambers are fitted with pistons operable to expel the trapped non-sealant material from the chambers into the flowway upon movement of the closure member to the flowway-opening position.

Furthermore, valves, having sealing grooves as herein contemplated, when left in the open position for extended periods, tend to lose groove sealant which is replaced by incursion of line fluid and sediment. When thereafter moved to the closed position, even though the valve is equipped with an automatic sealing system, some time elapses before entrapped line fluid is displaced.

To obviate this condition, the present invention further contemplates the provision of means for establishing a connection between the reservoir and the sealing grooves when the closure member is in the open position, whereby the elevated pressure available by reason of the previously-mentioned dual-area piston will be effective to promptly displace any line fluid entrapped in the grooves incident to movement of the closure member from the closed to the open position, and to thereafter maintain the grooves filled with sealant under the elevated pressure so as to prevent intrusion of line fluid while the closure member remains in the open position.

Various other objects and advantages of this invention will become more readily apparent from the following detailed description when read in conjunction with the accompanying drawing which illustrates a useful embodiment in accordance with this invention.

In the drawing, FIG. 1 is a partly sectional, partly elevational view of a gate-type valve in accordance with one embodiment of this invention, showing the closure member in the flowaway-closing position;

FIG. 2 is a vertical, cross-sectional view taken along line 2—2 of FIG. 1;

FIG. 3 is a horizontal, cross-sectional view taken along line 3—3 of FIG. 2, with the closure member in the flowway-closing position;

FIG. 3A is a view similar to FIG. 3 but with the closure member in the flowway-opening position;

FIG. 4 is an elevational view of the gate-type closure member incorporated in the illustrative embodiment;

FIG. 5 is a cross-sectional view taken along line 5—5 of FIG. 4;

FIG. 6 is a fragmentary longitudinal, vertical sectional view similar to FIG. 1, showing the closure member in a position immediately preceding its fully closed position; and FIG. 7 is a cross-sectional view taken along line 7—7 of FIG. 6.

Referring to the drawing, the valve in the embodiment illustrated is of the through-conduit, gate-type and comprises a housing, designated generally by the numeral 10, having coaxial opposed flow ports 11 defining the flowway 12 which is intersected interiorly of the housing by the gate chamber 13. The upper end of chamber 13 is closed by means of a generally conventional bonnet member 14 which is removably secured to the upper end of the housing by means of studs 15.

A closure member which, in the illustrative embodiment, comprises a one-piece, generally rectangular, flat-sided gate member, designated generally by the numeral 16, of the through-conduit type comprising an upper solid closure portion 17 and a lower through-conduit opening 18. The closure member is arranged in the gate chamber for reciprocation across flowway 12 between flowway-opening and flowway-closing positions by means of a stem 19 of any suitable and conventional construction, the details of which form no part of the present invention. The inner end of each of the flow ports 11 is counterbored in two steps to provide the outer large diameter bore section 20 defining the outwardly facing internal shoulder 21 preferably cut at a rearwardly sloping angle, as shown, and a smaller diameter inner bore portion 22 defining the outwardly facing internal shoulder 23 disposed rearwardly of shoulder 21. Slidably mounted in bore portion 20 is a seat ring 24, the inner end of which is reduced in diameter to form the cylindrical neck 25 which is slidably receivable in the smaller diameter bore portion 22. The reduction in diameter of the rearward end of the seat ring to form neck 25 provides the rearwardly facing annular shoulder 26 opposing shoulder 21. The length of neck 25 is made somewhat less than the length of bore portion 22 so as to provide a space between the rearward end of neck 25 and shoulder 23 in which an annular spring 26 is disposed in compression to resiliently bias seat ring 24 outwardly of the counterbores toward the opposed face of gate 16. A slidable seal, such as an O-ring 27, is mounted between the exterior of seat ring 24 and bore portion 20 and a second slidable seal, such as O-ring 28, is mounted about the exterior of neck 25 between the latter and the wall of bore portion 22, the seals providing a slidable, fluid-tight seal between the seat ring and the wall of the seat-receiving recess in the end of the flow port. These seals will also be disposed on opposits sides of the space 26*a* defined between shoulders 21 and 26. Dowel pins 29 extend across space 26*a* between shoulders 21 and 26 to prevent rotation of the seat rings within the recesses in which they are disposed, while permitting limited axial movement of the rings.

An annular groove 30 is provided in the external circumference of ring 24 between seals 27 and 28 and communicates with a transverse passageway 31 extending longitudinally through ring 24 communicating at one end with space 26*a* (see FIG. 3) and at the other end with the forward or gate-engaging face of ring 24. The latter is provided with an annular sealing groove 32 disposed about the bore of the seat ring and radially spaced a short distance from passageway 31 and is arranged to communicate with the latter through a jumper recess 33 appropriately located in the side face of closure portion 17 of the gate to inter-connect passageway 31 with groove 32 when the gate is in the fully closed position, as best seen in FIG. 3. A second jumper recess 33*a* is provided in the side face of the through-conduit portion of the gate opposite the center of opening 18 located to communicate passageway 31 with groove 32 when the gate is in the fully open position. In the valve construction illustrated, housing 10 is provided at one side with an enlarged boss 35 which is drilled from its lower end to form a chamber 36 constituting the single sealant reservoir for the valve. The lower end of chamber 36 is closed by means of a screw plug 37. A port 38 extends through the wall of the housing and provides communication between gate chamber 13 and the interior of reservoir chamber 36 near the lower end of the latter. A sealant displacing barrier or piston 39 is slidably mounted in chamber 36 above port 38 and dimensioned to form a sealing fit in the reservoir. Piston 39 is provided with a cylindrical stem 40, smaller in diameter than piston 39, which extends upwardly and is slidable through a corresponding opening 41 in the upper portion of the boss to the exterior thereof, so that the outer end face 42 of stem 40 is exposed to atmospheric pressure. An annular seal ring, such as the O-ring 43, is mounted about stem 40 to form a slidable seal between the latter and the wall of opening 41.

A pressure-type sealant supply fitting 44 of conventional design is inserted in a socket 45 in the side of boss 35, and a passage 46 communicates the interior of socket 45 with the interior of chamber 36 above piston 39. The bottom of socket 45 has an extension 47 from which a pair of lateral passages 48 lead to passages 49 (see FIG. 3), one of which communicates with each of the grooves 30 in the periphery of each seat ring. A check valve 50 is mounted in each lateral passage 48 to permit flow of sealant from socket extension 47 into the related passage 49, and thence to the respective grooves 30, while preventing movement of fluid in the opposite direction.

With this arrangement of sealant passages, it will be seen that when sealant is being introduced through fitting 44 via passage 46 into chamber 36, piston 39 will be moved downwardly to the limit of its travel, as determined by plug 37, and additional sealant will be forced through passages 48 and 49 into both grooves 30. From the latter, sealant will move through passages 31 rearwardly into space 26*a* and forwardly toward jumper recess 33 and sealing groove 32, with the closure member in the flowway-closing position. However, since the effective area defined by shoulder 26 is greater than the annular area defined by sealing groove 32, the pressure of the sealant will be effective on the larger area to increase the force operable on the seat rings whereby to urge the seat rings more tightly against the opposed faces of gate portion 17, thus preventing the loss of sealant through leakage between these surfaces during the filling of the reservoir with the sealant. Thus, the greater the pressure exerted on the sealant, the tighter the seat rings will be forced against the opposed gate faces.

The structure employed in purging the sealing grooves of non-sealant material, such as the usual line fluid, rust, scale and the like, is mounted in closure member 16 and includes a pair of cylindrical recesses 55 extending from the opposite side edges of the closure member inwardly of the closure portion 17, as best seen in FIGS. 4 to 7, inclusive. Each of these recesses is counterbored at its inner end to define a smaller diameter cylindrical chamber 56 in which is slidably mounted a cylindrical piston 57, the inner end of which carries a seal ring 58 to form a slidable fluid-tight seal with the wall of chamber 56. The outer end of the piston carries an enlarged flange 59 which will be spaced from an internal shoulder 61 defined in recess 55 by the rdeuction in diameter to form chamber 56. A stop ring 62 is mounted in the outer end of recess 55 for abutment by flange 59 to limit outward travel of piston 57. The inner ends of the cylinders 56 are connected to lateral passageways 63 which open to the opposite side faces of closure portion 17 at points generally directly opposite each other. The outer ends of these passages 63 are positioned in the side faces of the closure member so as to register with the related sealing grooves 32 when the closure member is in the fully closed position, as illustrated in FIG. 1. The outer end of each of the recesses 55 will be open to the interior of the gate chamber and thereby exposed to pressures existing in the gate chamber. Thus, the pistons 57 will be subjected to differentials in pressure acting on opposite ends of the piston, as will appear subsequently in the description of the operation of the valve.

The operation of the automatic sealing system is as follows: As the valve is operated to closed and open positions, line fluid turbulence will generally attack the lower portions of the seat sealing groves, washing out at least some of the sealant therein and generally collecting in the grooves.

As soon as gate 17 reaches the fully closed position, it will be seen, first, that the sealing grooves will be placed into communication through jumper recesses 33, shown in FIG. 3, with the sealant reservoir through the related passageways. However, the closing of flowway 12 will immediately produce a pressure differential across the closure member in the downstream direction (the fluid flow direction being indicated by the arrows in FIG. 1), with the result that sealant will be caused to flow from the reservoir through the downstream passages 48 and 49, thence via groove 30 and passage 31 into jumper recess 33, and thence into the downstream sealing groove 32. When gate 16 reaches a near closed position, as seen in FIG. 6, port 63 of the downstream trap chamber 56 becomes exposed to relatively low downstream pressure whereas piston 57 therein is subjected to a higher pressure existing in the valve housing. This differential pressure will actuate the trap piston 57 and move it inwardly, as seen in the left chamber of FIG. 5. When the gate 16 is fully closed, port 63 communicates with the downstream seat groove 32 and since the pressure in reservoir 36 will be elevated, due to the dual-area piston being partially exposed to atmosphere, high pressure sealant flow will be conducted thereupon via jumper 33 and passage 31 to seat groove 32, driving line fluid trapped in the lower portion of groove 32 into downstream trap chamber 56.

As the sealant flows into groove 32 it will displace the non-sealant fluid and detritus which will have been trapped in the groove upon closing of the valve, and this trapped fluid will be displaced by entering sealant into downstream trap passage 63 which will be in registration with groove 32, as shown in FIG. 1, and the non-sealant fluid thus displaced will be ejected into chamber 56 on the downstream side of the closure member. The capacity of chamber 56 will be made such as to enable it to receive a volume of fluid substantially equal to that which might be trapped in sealing groove 32. With this arrangement for purging the sealing groove, it will be seen that the latter may now become completely filled with sealant, thereby effectively assuring a complete circumferential seal about the flowway between the downstream seat and the opposed gate face.

In the more conventional automatic sealing valve, the pressure differential which actuates the sealant-displacing piston will, in a leaking valve, be the pressure difference between the housing upstream and downstream groove pressures acting on the opposite faces of a slidable disk-like piston in a reservoir. This differential in the ordinary case will be relatively small, being also reduced by friction losses in the passages connecting the reservoir and the downstream sealing groove. As a result, the movement of the sealant to the sealing groove may be comparatively slow.

In the structure as herein described, the effective pressure differential will be greatly increased by extending the end 42 of piston stem 40 to the exterior of the reservoir and exposing it to the ambient atmospheric pressure, so that the resulting differential will be that between the upstream pressure exerted through port 38 against the lower face 39*a* of the piston and atmospheric pressure acting on end face 42 of the piston stem. The resultant greatly increased differential forces will be effective to move the sealant at greatly increased rate from the reservoir into the downstream sealing groove, thus assuring rapid and efficient sealing between the downstream seat and the closure member.

When the closure member is next moved back to the open position, then as soon as passages 63 move out of registry with sealing grooves 32 and into communication with flowway 12, a differential pressure will immediately develop between the line pressure in the gate chamber, which will have been trapped therein upon closing of the closure member, and the downstream pressure in the flowway. The gate chamber pressure will act on the enlarged outer end of piston 47 to force the latter inwardly (see FIG. 5), displacing the trapped fluid contained in trap chamber 56 and ejecting it through passage 63 into flowway 12, thereby clearing the chamber for reception of non-sealant material upon the next closing of the valve. If desired, a coil spring 60, shown in broken lines in FIGS. 5 and 7, may be disposed about each piston 57 in compression between flange 59 and shoulder 61 to additionally assure sufficient outward movement of the pistons to admit to chambers 56 the non-sealant material displaced from the sealing grooves.

Moreover, when the gate has moved to the fully open position, jumper recess 33*a* will again place the sealing grooves into communication with passages 31, whereupon the grooves will be immediately subjected to the elevated pressure existing in the sealant reservoir which will act to maintain the grooves filled with sealant while the gate is in the open position after having displaced any line fluid and detritus which may have entered the grooves incident to the opening movement of the gate.

By providing identical connecting passage arrangements between the reservoir and both sealing groove systems, it becomes immaterial in which direction the valve may be oriented in a pipe line.

From the foregoing, it will be evident that there has been provided an improved form of automatic sealing valve employing a single reservoir for supplying both sides of the valve, and in which there is employed the combination of axially slidable seats with a dual-area sealant-displacing piston in the reservoir for intensifying the sealing action between the closure seats and the closure member, while the reservoir is being filled with sealant to prevent loss of sealant during the filling and, in addition, providing an improved system for expelling non-sealant material which may collect in the sealing grooves while the valve is in the open position so as to permit effective filling of the grooves with sealant when the valve has attained the closed position.

It will be understood that various changes and modifications may be made within the details of the illustrative embodiment within the scope of the appended claims but without departing from the spirit of the invention.

What I claim and desire to secure by Letters Patent is:

1. In an automatic sealant sealed valve including a housing having flow ports defining a flowway therethrough, a closure chamber intersecting said flowway, and a closure member in the chamber movable between positions opening and closing said flowway, annular seat members slidably disposed about the inner ends of said flow ports for movement into engagement with opposed faces of said closure member, an annular sealing groove disposed about said flowway between the inner end of each of said seat members and said closure member, a single sealant reservoir carried by the housing, a sealant-displacing barrier member slidably disposed in said reservoir, means communicating said closure chamber with said reservoir on one side of said barrier member, passage means communicating the reservoir on the opposite side of said barrier member with both sealing grooves when the closure member is in the flowway-closing position, and means for introducing sealant into said reservoir between said other side of said barrier member and said passage means, said barrier member having an area on said one side exposed to line pressure in said closure chamber, and having first and second areas on said other side exposed, respectively, to said sealing grooves and to atmospheric pressure exteriorly of said housing, whereby to increase the differential pressure force acting on said sealant.

2. A valve according to claim 1 including means directing said sealant against the outer ends of said seat members whereby to hydraulically bias said seat members against said closure member at said increased pressure force.

3. A valve according to claim 2 wherein said means directing said sealant against the outer ends of said seat members includes an annular area on the outer end of each seat member exposed to the pressure of said sealant, said area being greater than that of the related sealing groove.

4. A valve according to claim 1 wherein said barrier member comprises a cylindrical piston having a cylindrical stem of smaller diameter extending from said other side of the piston through an opening in a wall of the housing to the exterior thereof.

5. A valve according to claim 1 having check valve means in said passage means disposed to prevent reverse flow of fluid from said passage means to said reservoir.

6. A valve according to claim 1 wherein said closure member is a generally rectangular, one-piece, flat-sided gate body comprising a solid closure portion, and a through-conduit opening longtudinally spaced from said portion.

7. A valve according to claim 6 wherein said gate body carries chamber means arranged to communicate with said sea'ing grooves when said gate body is in the flowway-closing position to receive material displaced from said sealing grooves by entrance of sealant therein, and plunger means in said chamber means operable in response to pressure differentials across the plunger means when the gate body moves to the flowway-opening position to expel said material previously received in said chamber means.

8. A valve according to claim 7 wherein said chamber means comprises a cylindrical recess in said closure portion having an outer end open to a side edge of said portion and having a passage communicating its inner end with the side face of said closure portion at a point adapted when in the flowway-closing position of said portion to register with one of said sealing grooves, said plunger means being slidably disposed in said recess between the ends thereof.

9. In an automatic sealant sealed valve including a housing having flow ports defining a flowway therethrough, a closure chamber intersecting said flowway, and a closure member in the chamber movable between positions opening and closing said flowway, annular seat members each having a front closure sealing face and a rear surface slidably disposed about the inner ends of said flow ports for movement into engagement with opposed faces of said closure member, an annuar sealing groove disposed about said flowway between the inner end of each of said seat members and said closure member, a single sealant reservoir carried by the housing, a barrier member slidably disposed in said reservoir having a sealant displacing side and a line pressure side, means communicating said closure chamber with the interior of said reservoir on said line pressure side of said barrier member, passage means communicating the reservoir on the opposite side of said barrier member with both sealing grooves when the closure member is in the flowway-closing position, means for introducing sealant from said reservoir, and means conducting sealant from said reservoir through said passage means and against said rear surfaces of said seat members to thereby bias said seat members toward said closure member.

10. In an automatic sealant sealed valve including a housing having flow ports defining a flowway therethrough, a closure chamber intersecting said flowway, and a closure member in the chamber movable between positions opening and closing said flowway, annular seat members each having a front closure sealing face and a rear surface slidably disposed about the inner ends of said flow ports for movement into engagement with opposed faces of said closure member, a sealing groove system including an annular sealing groove disposed about said flowway between the inner end of each of said seat members and said closure member, a sealant reservoir carried by the housing a sealant-displacing barrier member slidably disposed carried by said reservoir, means communicating said closure chamber with said reservoir on one side of said barrier member, passage means communicating the reservoir on the opposite side of said barrier member with the sealing groove system when the closure member is in the flowway-closing position, and means for introducing sealant into said reservoir between said other side of said barrier member and said passage means, said barrier member having an area on said one side exposed to line pressure in said closure chamber, and having first and second areas on said other side exposed, respectively, to downstream pressure and to pressure exteriorly of said chamber, whereby to increase the differential pressure force acting on said sealant, means conducting sealant from said reservoir through said passage means and against said rear surfaces of said seat members to thereby bias said seat members toward said closure member.

11. In an automatic sealant sealed valve including a housing having flow ports defining a flowway therethrough, a closure chamber intersecting said flowway, a closure member in the chamber movable between positions opening and closing said flowway, a pair of closure seat members about said flowway, a sealing groove disposed about the flowway between each of said seat members and said closure, a single sealant reservoir carried in the housing, a sealant displacing barrier member slidably disposed in said reservoir, means communicating said closure chamber with said reservoir on one side of said barrier member, pasage means communciating the reservoir on the opposite side of said barrier member with both sealing grooves solely when the closure member is in the terminal closed and open positions, means for introducing sealant into said reservoir, said barrier member having an area on one side exposed to line pressure in said chamber, and having first and second areas on said other side exposed, respectively, to pressure in said grooves and pressure exteriorly of said chamber, whereby to increase differential pressure force acting on the sealant in said grooves.

References Cited

UNITED STATES PATENTS

| | | | |
|---|---|---|---|
| 2,710,017 | 6/1955 | Cartèr | 137—246.11 |
| 2,956,580 | 10/1960 | Heath | 137—246.12 |
| 2,957,492 | 10/1960 | Volpin | 137—246.12 |
| 2,999,510 | 9/1961 | Volpin | 137—246.12 |
| 3,135,285 | 6/1964 | Volpin | 137—246.12 |
| 3,280,835 | 10/1966 | Hill | 137—246.11 |

FOREIGN PATENTS 582,711 9/1959 Canada.

CLARENCE R. GORDON, *Primary Examiner.*